W. H. HYATT.
RECLAMATION OF WASTE RUBBER AND VULCANITE.
APPLICATION FILED JUNE 4, 1909.

992,425.

Patented May 16, 1911.

Witnesses:—

Inventor:—
William Herbert Hyatt
by his attorneys

UNITED STATES PATENT OFFICE.

WILLIAM HERBERT HYATT, OF COOKHAM, ENGLAND, ASSIGNOR TO PERCY DOUGLAS PENN, OF SOUTH CROYDON, ENGLAND.

RECLAMATION OF WASTE RUBBER AND VULCANITE.

992,425.     Specification of Letters Patent.     Patented May 16, 1911.

Application filed June 4, 1909. Serial No. 500,106.

*To all whom it may concern:*

Be it known that I, WILLIAM HERBERT HYATT, a subject of the King of Great Britain, and resident of Sycamore Cottage, Cookham, in the county of Berkshire, England, chemical expert and engineer, have invented new and useful Improvements Relating to the Reclamation of Waste Rubber and Vulcanite, of which the following is a specification.

In restoring old and waste vulcanized rubber and vulcanite to a condition in which it can be used again for various useful purposes it has been proposed to take the old material, grind it up and remold it with the aid of very considerable heat and pressure sufficient to agglomerate the mass and compress out the air holes. Much of the difficulty which is experienced in making up old vulcanized rubber and vulcanite into new forms is due to the presence of atmospheric air in the material on account of its offering a mechanical resistance to the consolidation of the material when pressure is applied and on account of its tendency to give rise to and support combustion when heat for softening the material is employed.

According to the present invention in order to facilitate the treatment the vulcanized rubber or vulcanite which is to be treated to render it fit for further use is placed in a closed vessel from which atmospheric air is exhausted. The vessel is heated in any convenient manner and the material is subjected to pressure or similar treatment to produce a mass of homogeneous character. In this state the material may be remade or molded, pressure being employed to give the required form, the vacuum pump being preferably maintained in action during the molding operation.

The material to be treated may be ground up or cut into small pieces at the beginning of the treatment but it is found that it is by no means necessary to subdivide the material beyond reducing it to dimensions suitable for conveniently entering the mold or other chamber where the treatment is to be carried out. On the contrary it is undesirable to destroy what is termed the fiber of the rubber by grinding up the latter.

In order to illustrate the method of carrying out this invention a drawing is annexed of an experimental mold used for remolding old rubber into a cylindrical plug.

Figure 1:
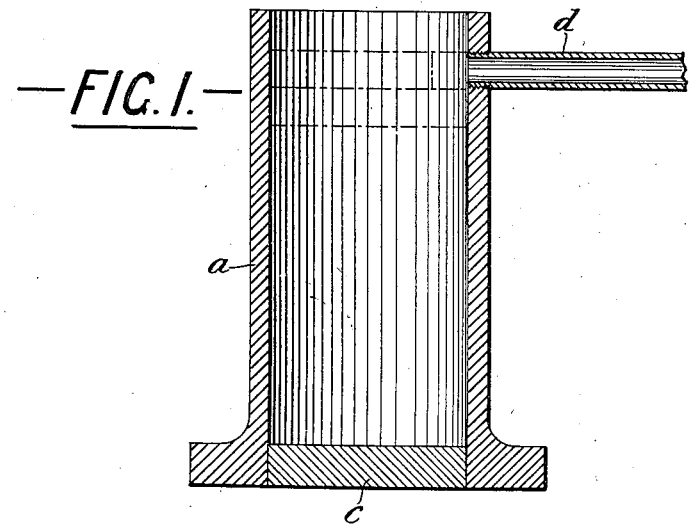
Figure 2:
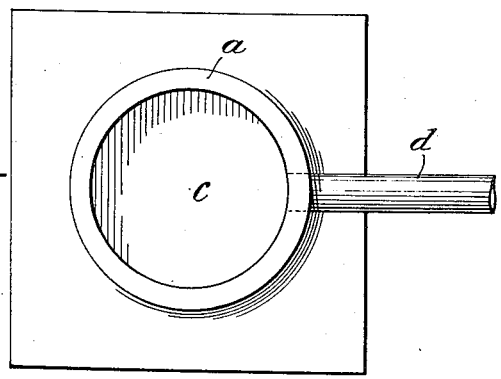

Figure 1 is a sectional elevation, and Fig. 2 is a plan view.

$a$ is a metal cylinder, $b$ is a removable plug closely fitting the top and $c$ is a removable plug closely fitting the bottom of the cylinder.

$d$ is a pipe by which atmospheric air can be exhausted from the cylinder $a$.

The bottom of the cylinder being closed by the plug $c$ rubber ground or otherwise is placed in the cylinder and the top plug $b$ is partly inserted. In the meantime an exhaust pump is connected to the pipe $d$ and the air is drawn out. For heating the cylinder hot sand may be employed or any other convenient heating device. Pressure can be applied to the top plug $b$ by means of a screw which gradually forces the said plug down on the rubber and causes it to consolidate into a mass which when cold will come from the mold on the end being displaced as an elastic homogeneous block.

Experiments have shown that with the aid of a vacuum vulcanized rubber and vulcanite can be softened at a temperature of 300 to 430° F. so that with suitable pressure or similar treatment it can be made into blocks, sheets and other useful articles. The pressure need be only sufficient to consolidate the mass, which in the absence of air can be readily accomplished and to cause the softened material to assume the form desired.

What I claim as my invention and desire to secure by Letters Patent is—

The treatment of waste vulcanized rubber and vulcanite to reform the same into articles for further use, consisting in exhausting and keeping exhausted the air from within and around the mass under treatment and while maintaining a temperature sufficiently high to render the mass soft and sufficiently low to retain the fiber uninjured applying pressure sufficient to cause the mass to take the desired shape.

In testimony, that I claim the foregoing as my invention, I have signed my name in presence of two witnesses, this 25th day of May 1909.

WILLIAM HERBERT HYATT.

Witnesses:
ALFRED BISHOP,
H. D. JAMESON.